US009411758B2

(12) United States Patent
Yamashita

(10) Patent No.: US 9,411,758 B2
(45) Date of Patent: Aug. 9, 2016

(54) SEMICONDUCTOR DEVICE

(71) Applicant: Renesas Electronics Corporation, Kawasaki-shi, Kanagawa (JP)

(72) Inventor: Hajime Yamashita, Kawasaki (JP)

(73) Assignee: Renesas Electronics Corporation, Kanagawa (JP)

(*) Notice: Subject to any disclaimer, the term of this patent is extended or adjusted under 35 U.S.C. 154(b) by 673 days.

(21) Appl. No.: 13/739,674

(22) Filed: Jan. 11, 2013

(65) Prior Publication Data

US 2013/0185468 A1    Jul. 18, 2013

(30) Foreign Application Priority Data

Jan. 13, 2012  (JP) .................................. 2012-005176

(51) Int. Cl.

| G06F 13/36 | (2006.01) |
|---|---|
| G06F 13/40 | (2006.01) |
| G06F 1/32 | (2006.01) |
| G06F 13/364 | (2006.01) |
| G06F 1/00 | (2006.01) |

(52) U.S. Cl.
CPC .............. *G06F 13/364* (2013.01); *G06F 1/32* (2013.01); *G06F 13/40* (2013.01); *Y02B 60/1228* (2013.01)

(58) Field of Classification Search
CPC .............. G06F 13/40; G06F 1/00; G06F 1/32
USPC ......................................................... 710/110
See application file for complete search history.

(56) References Cited

U.S. PATENT DOCUMENTS

| 5,898,879 | A  | * | 4/1999  | Kim ............................... 713/322 |
|---|---|---|---|---|
| 6,463,490 | B1 | * | 10/2002 | Wang et al. ................... 710/110 |
| 6,467,065 | B1 | * | 10/2002 | Mendez et al. ............... 714/800 |
| 6,694,390 | B1 | * | 2/2004  | Bogin et al. .................... 710/53 |
| 7,155,618 | B2 | * | 12/2006 | Moyer et al. .................. 713/320 |
| 7,231,467 | B2 | * | 6/2007  | Baker et al. ...................... 710/9 |
| 7,809,873 | B2 | * | 10/2010 | Perry et al. .................... 710/110 |
| 7,941,570 | B2 | * | 5/2011  | Flanagan et al. .................. 710/5 |
| 8,046,514 | B2 | * | 10/2011 | Whitaker ...................... 710/124 |
| 8,117,475 | B2 | * | 2/2012  | Pesavento et al. ............ 713/323 |
| 8,190,924 | B2 | * | 5/2012  | Henmi .......................... 713/300 |
| 8,274,794 | B2 | * | 9/2012  | Huang et al. .................. 361/735 |
| 8,862,685 | B2 | * | 10/2014 | Schriefer et al. .............. 709/211 |

FOREIGN PATENT DOCUMENTS

| JP | 2004-526223 A | 8/2004 |
|---|---|---|
| JP | 2005-122337 A | 5/2005 |
| JP | 2007-52525 A | 3/2007 |

* cited by examiner

*Primary Examiner* — Henry Tsai
*Assistant Examiner* — Christopher A Daley
(74) *Attorney, Agent, or Firm* — Foley & Lardner LLP

(57) ABSTRACT

A semiconductor device according to the present invention includes a first module that issues a first transaction from a first interface unit to be a bus master, a second module that includes a second interface unit to be a bus slave and a third interface unit to be a bus master, and issues a second transaction in response to the first transaction, a third module that receives the second transaction by a fourth interface unit to be a bus slave, a bus master stop request control unit that asserts a bus master stop request and completes an assertion process in response to assertion of a bus master stop acknowledgement, and a code addition unit that adds to the first transaction a compulsory process request code for forcing issuance of the second transaction regardless of the bus master stop request.

7 Claims, 9 Drawing Sheets

| LOGICAL ADDRESS | PHYSICAL ADDRESS | ACCESS ADDITION INFORMATION | COMPULSORY EXECUTION FLAG |
|---|---|---|---|
|  |  |  |  |
|  |  |  |  |
| ⋮ | ⋮ | ⋮ | ⋮ |
|  |  |  |  |

| MORE SIGNIFICANT BIT OF ACCESS ADDRESS | BUS SLAVE ID OF ACCESS DESTINATION | COMPULSORY EXECUTION FLAG |
|---|---|---|
|  |  |  |
|  |  |  |
| ... | ... | ... |
|  |  |  |

Fig. 10

SEMICONDUCTOR DEVICE

CROSS-REFERENCE TO RELATED APPLICATIONS

This application is based upon and claims the benefit of priority from Japanese patent application No. 2012-005176, filed on Jan. 13, 2012, the disclosure of which is incorporated herein in its entirety by reference.

BACKGROUND

The present invention relates to a semiconductor device, and particularly to a semiconductor device to which a plurality of circuit blocks are connected via a bus.

In a semiconductor device, there are many suggested bus systems for communicating between a plurality of modules via a bus. In such a bus system, there may be a change in the state of the system such as starting power management control. In this case, the bus system issues a bus stop request to a bus master that issues a transaction to the bus in an attempt to stop issuing new transactions. Then, the bus system waits for the transaction flowing through the bus to complete and changes the state of the system. Examples of the techniques for changing the state of the system including a plurality of modules that are in mutual cooperation are disclosed in Japanese Unexamined Patent Application Publication Nos. 2007-52525 and 2005-122337, and Published Japanese Translation of PCT International Publication for Patent Application, No. 2004-526223.

Japanese Unexamined Patent Application Publication No. 2007-52525 discloses a technique to control supplying and stopping of a signal to a second module by a gate signal generated in response to a request from a first module when memory modules are in the master/slave relationship.

In Japanese Unexamined Patent Application Publication No. 2007-52525, upon a failure in any device among a plurality of devices, usage of the bus by a normally operating bus is restricted except for the case of processing the transactions already issued by the devices. After that, a bus system disclosed in Japanese Unexamined Patent Application Publication No. 2007-52525 outputs bus characteristic information to a bus while resetting the device with the failure on the condition that there is no incomplete transaction and allows the device with the failure to receive the bus characteristic information at the time of cancelling the reset.

Published Japanese Translation of PCT International Publication for Patent Application, No. 2004-526223 discloses a method of broadcasting data to multiple targets across a system bus, such as the peripheral component interconnect (PCI) bus, that does not normally support broadcast transfers, in which one target responds to the bus transaction and the remaining targets listen in on the bus transaction to receive data from the system bus. In Published Japanese Translation of PCT International Publication for Patent Application, No. 2004-526223, the responding target stalls the bus transaction when any of the listening targets communicates to the responding target that they are temporarily unable to accept the data on the bus.

SUMMARY

However, in regard to modules connected to a bus in a bus system, there is a module including a reception interface that functions as a bus slave and a transmission interface that functions as a bus master. Such a module issues a new transaction to other modules in order to complete a transaction received by the reception interface.

In the bus system including such a module connected to the bus, it may not be possible to issue a new transaction for completing the transaction received by the corresponding module after a bus stop request is asserted. When the bus stop request is asserted at such timing, another module that issued the transaction to the corresponding module cannot obtain a response to the issued transaction and assert a bus stop acknowledgement corresponding to the bus stop request. Therefore, under such a circumstance, the present inventor has found a problem that the system is unable to recognize the completion of the transaction flowing through the bus by the bus stop acknowledgement and thereby causing the system to hang.

An aspect of the present invention is a semiconductor device including a plurality of interface units that are connected via a bus and assigned with either one of a bus master that issues a transaction and stops issuing the transaction in response to a bus master stop request and a bus slave that receives the transaction. The semiconductor device has a first module that includes a first interface unit functioning as the bus master and issues a first transaction, a second module that includes a second interface unit functioning as the bus slave and a third interface unit functioning as the bus master, and issues a second transaction in response to the first transaction, a third module that includes a fourth interface unit functioning as the bus slave and receives the second transaction, a bus master stop request control unit that asserts the bus master stop request and, in response to assertion of a bus master stop acknowledgement corresponding to the bus master stop request, completes an assertion process of the bus master stop request, and a code addition unit that adds a compulsory process request code to the first transaction. The second module issues the second transaction while asserting the bus master stop acknowledgement when the second module receives the first transaction added with the compulsory process request code in a period when the bus master stop request is asserted, and the first module asserts the bus master stop acknowledgement corresponding to the bus master stop request in response to reception of a response to the first transaction.

In the semiconductor device according to the present invention, when the second module receives the first transaction added with the compulsory process request code, the second module issues the second transaction regardless of whether the bus master stop request is asserted. Accordingly, it is possible to issue the second transaction even when it is necessary to issue the second transaction required to complete the operation by the first transaction after the bus master stop request is asserted, and thereby preventing the bus system from hanging.

The semiconductor device according to the present invention can prevent a bus system from hanging.

BRIEF DESCRIPTION OF THE DRAWINGS

The above and other aspects, advantages and features will be more apparent from the following description of certain embodiments taken in conjunction with the accompanying drawings, in which:

FIG. 10 is an example of a schematic diagram of a routing table of a router according to the second embodiment.

DETAILED DESCRIPTION

First Embodiment

Figure 1:
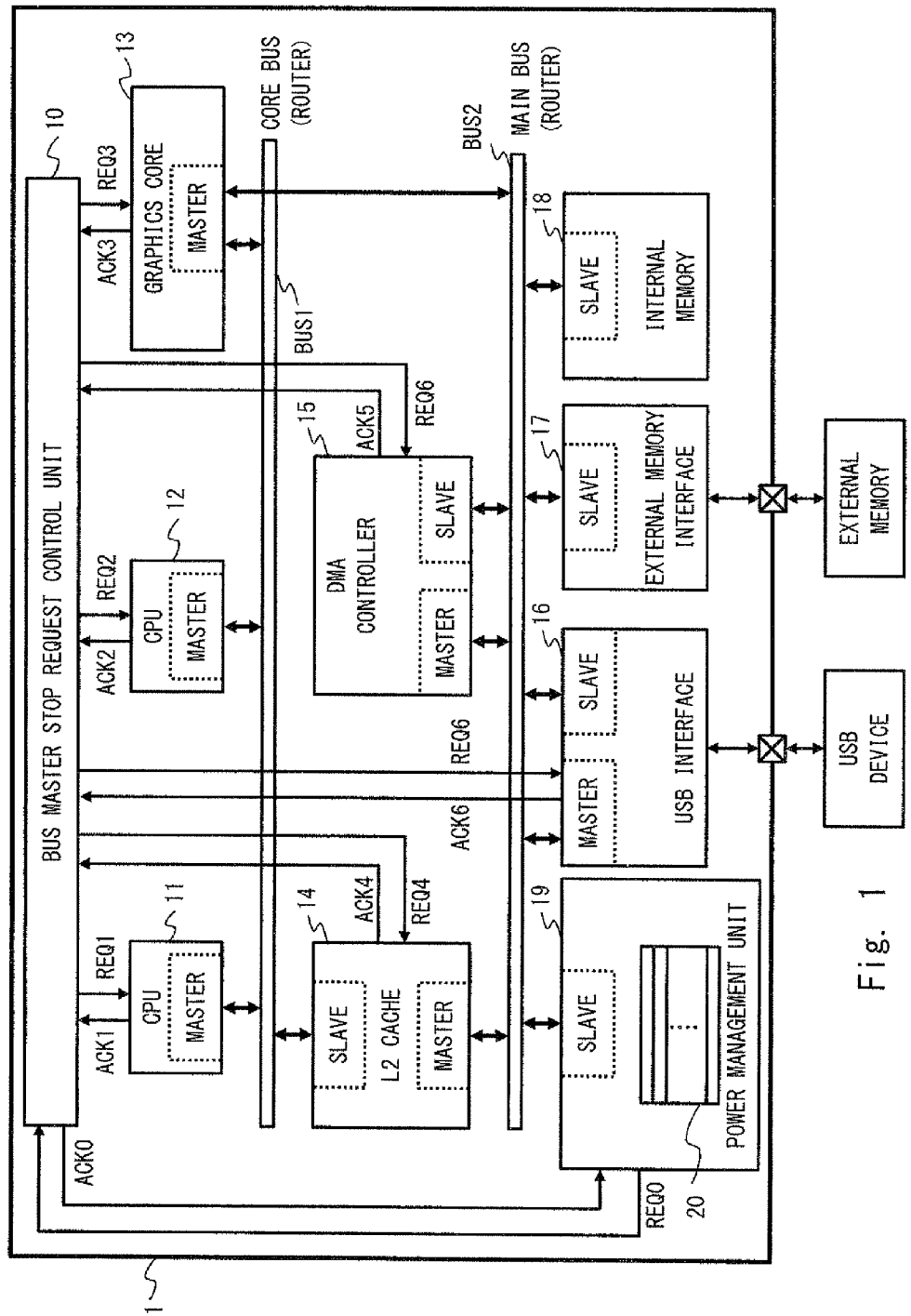
FIG. 1 is a block diagram of a semiconductor device according to a first embodiment.

Hereinafter, embodiments of the present invention are explained with reference to the drawings. FIG. 1 is a block diagram of a semiconductor device 1 according to the first embodiment. Note that the block diagram shown in FIG. 1 illustrates a USB device and an external memory used by the semiconductor device 1.

As shown in FIG. 1, the semiconductor device 1 according to the first embodiment includes a bus master stop request control unit 10, CPUs (Central Processing Units) 11 and 12, a graphics core 13, an L2 cache 14, a DMA controller 15, a USB interface 16, an external memory interface 17, an internal memory 18, and a power management unit 19.

As shown in FIG. 1, in the semiconductor device 1, the CPUs 11 and 12, the graphics core 13, and the L2 cache 14 are connected to one another via a core bus BUS1, and the L2 cache 14, the DMA controller 15, the USB interface 16, the external memory interface 17, the internal memory 18, and the power management unit 19 are connected to one another via a main bus BUS2. Note that the configuration of the system shown in FIG. 1 is merely an example and the connection of the circuit blocks to either of the buses can be changed depending on the specifications of the system of the semiconductor device 1.

Moreover, the semiconductor device 1 includes a plurality of interface units that are connected via buses. The interface units are assigned with either one of the functions, i.e., a bus master that issues a transaction and stops issuing the transaction in response to a bus master stop request and a bus slave that receives the transaction. These interface units are implemented as a part of the circuit blocks connected to the core bus or the main bus.

Further, in the semiconductor device 1, the core bus and the main bus are composed using a router. The router outputs the transaction issued by the interface unit functioning as the bus master to the interface unit functioning as the bus slave. More specifically, the router refers to an access address included in the transaction and determines an output destination of the transaction, and issues the transaction to the interface unit functioning as the bus slave of the output destination determined consequently.

The bus master stop request control unit 10 asserts bus master stop requests REQ1 to REQ6, and in response to assertion of bus master stop acknowledgements ACK1 to ACK6 corresponding to the bus master stop requests REQ1 to REQ6, completes an assertion process of the bus master stop requests REQ1 to REQ6. More specifically, the bus master stop request control unit 10 asserts the bus master stop requests REQ1 to REQ6 in response to assertion of a bus stop request REQ0 output from the power management unit 19. Moreover, the bus master stop request control unit 10 asserts a bus stop acknowledgement ACK0 to be output to the power management unit 19 in response to the assertion of the bus master stop acknowledgements ACK1 to ACK6 corresponding to the bus master stop requests REQ1 to REQ6. Asserting the bus stop acknowledgement ACK0 to be output to the power management unit 19 by the bus master stop request control unit 10 completes the assertion process of the bus master stop requests REQ1 to REQ6.

The CPUs 11 and 12, and the graphics core 13 are first modules that include a first interface unit functioning as the bus master and issue a first transaction. Moreover, the first module asserts the bus master stop acknowledgements ACK1 to ACK3 corresponding to the bus master stop requests REQ1 to REQ3 in response to reception of a response to the first transaction. The CPUs 11 and 12 are processing units that perform general calculations in the semiconductor device 1 according to a program. Additionally, the graphics core 13 is a processing unit that performs image processing in the semiconductor device 1.

The L2 cache 14, the DMA controller 15, and the USB interface 16 are second modules that include a second interface unit functioning as the bus slave and a third interface unit functioning as the bus master, and issues a second transaction in response to the first transaction. The second module issues the second transaction while asserting the bus master stop acknowledgements ACK4 to ACK6 upon receipt of the first transaction including a compulsory process request code in the period when the bus master stop requests REQ4 to REQ6 are asserted.

The L2 cache 14 is a cache memory that temporarily stores data used by the CPUs 11 and 12, and the graphics core 13. The L2 cache 14 obtains data requested by the internal memory or the external memory when requested data does not exist on a cache memory, and stores the obtained data to its own module while returning the obtained data to the requested source of the data.

The DMA controller 15 is a circuit block that controls direct memory accesses for transferring data between the circuit blocks without involving the CPUs 11 and 12. The USB interface 16 is an interface circuit for a USB device connected outside.

The external memory interface 17, the internal memory 18, and the power management unit 19 are third modules for receiving the second transaction that include a fourth interface unit functioning as the bus slave.

The external memory interface 17 is an interface circuit for transmitting and receiving data between the external memory and the semiconductor device 1. The internal memory 18 is a storage unit that stores the data used by the semiconductor device 1.

The power management unit 19 asserts the bus stop request REQ0 to be supplied to the bus master stop request control unit 10, and controls an operating state of at least one of the modules connected to the bus and the buses according to the bus stop acknowledgement ACK0 asserted by the bus master stop request control unit 10 upon completion of the assertion process in the bus master stop request control unit 10. The power management unit 10 includes a plurality of configuration registers (hereinafter referred to as a register group 20) that define the operating state of the modules connected to the buses and the buses. The register group 20 defines the operating state of at least one of the modules connected to the buses and the buses in response to the assertion of the bus stop acknowledgement ACK0. For example, the power management unit 19 changes the frequency of an operational clock of at least one of the modules connected to the buses and the buses, stops an operational clock signal, or blocks the power supply voltage of the module to be connected to the bus.

The CPU 11 or 12 rewrites a predetermined value of the configuration register group 20 in the power management unit 19. Further, the power management unit 19 asserts the bus stop request signal REQ0 in response to the rewrite of the predetermined register. The bus stop request signal REQ0 includes information specifying the module to be stopped.

In the semiconductor device 1 according to the first embodiment, when the second module (for example, the L2 cache 14, the DMA controller 15, and the USE interface 16) receives the first transaction added with the compulsory process request code in the period when the bus master stop requests REQ4 to REQ6 are asserted, the second module issues the second transaction while asserting the bus master stop acknowledgements ACK4 to ACK6. Specifically, the semiconductor device 1 includes a code addition unit that adds the compulsory process request code to the first transaction. This code addition unit can be mounted on various places on the bus system. In the first embodiment, an example is explained in which the code addition unit is implemented as a circuit composing the first module (for example, the CPUs 11 and 12, and the graphics core 13).

Since the CPUs 11 and 12, and the graphics core 13 that function as the first module have the same configuration of the interface unit as the code addition unit, the CPU 11 is explained as an example of the first module.

Figures 2, 3:
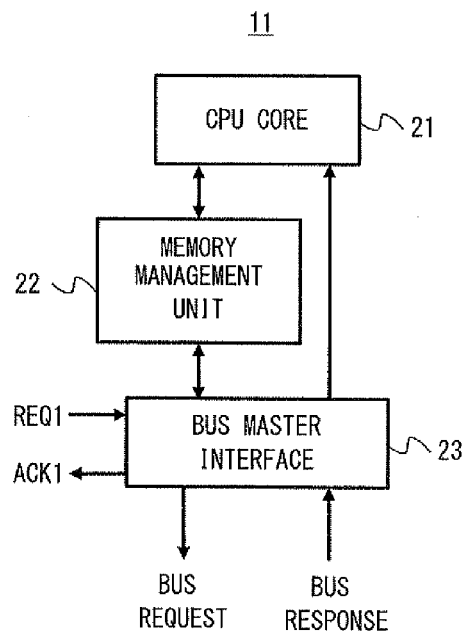
FIG. 2 is a block diagram of a CPU according to the first embodiment.
FIG. 3 is an example of a schematic diagram of a translation lookaside buffer according to the first embodiment.

FIG. 2 is a block diagram of the CPU 11. As shown in FIG. 2, the CPU 11 includes a CPU core 21, a memory management unit 22, and the first interface unit (for example, a bus master interface 23).

The CPU core 21 is a circuit block that performs calculations in the CPU 11 according to the program. The CPU core 21 issues an external access request according to the calculation result. The memory management unit 22 adds additional information to the external access request while converting an address of the external access request issued by the CPU core 21 from a logical address to a physical address. The bus master interface 23 outputs to the core BUS1 a bus request including the external access request and the additional information output from the memory management unit 22. The bus request output by bus master interface 23 will be the first transaction.

Upon receipt of a response corresponding to the bus request (for example, a bus response), the bus master interface 23 returns the bus response to the CPU core 21. Then, the CPU core 21 performs processes for the bus response.

Moreover, the bus master interface 23 stops issuing new bus accesses in the period when the bus master stop request REQ1 is asserted. Further, the bus master interface 23 asserts the bus master stop acknowledgement ACK1 in response to the bus response corresponding to the bus access that is issued lastly.

The operation of the memory management unit 22 is described below in more detail. The memory management unit 22 includes a Translation Lookaside Buffer (TLB). The memory management unit 22 refers to the TLB and converts the logical address into the physical address. Further, the memory management unit 22 refers to the TLB and adds additional information corresponding to the logical address of the external access address output from the CPU core 21. FIG. 3 shows an example of the TLB in the memory management unit 22. As shown in FIG. 3, the TLB is a table that associates one pair of the physical address, the access additional information, and the compulsory process request code (for example, a compulsory execution flag) with the logical address of the external access request output from the CPU core 21. In the CPU 11, the memory management unit 22 adds the access additional information and the compulsory flag to the external access request, thus the memory management unit 22 functions as the code addition unit.

Figure 4:
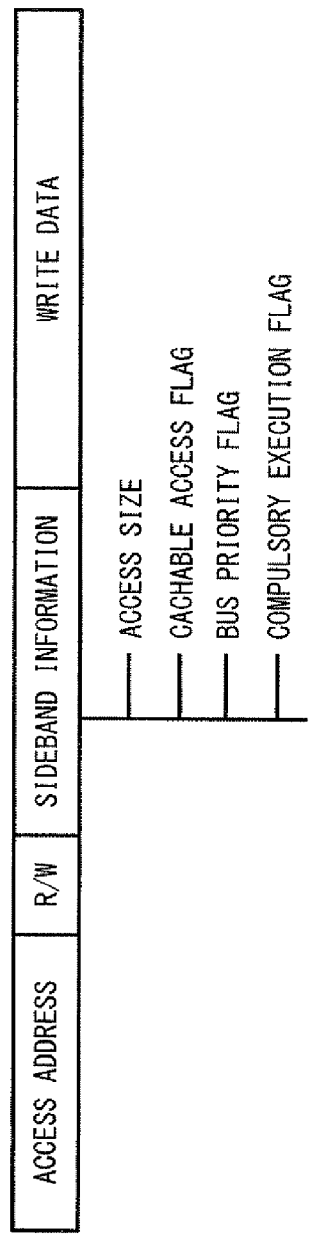
FIG. 4 is a schematic diagram of a data format of a bus request according to the first embodiment.

FIG. 4 shows an example of a schematic diagram of a data format of the bus access generated from the external access request and the additional information output from the memory management unit 22. As shown in FIG. 4, the bus request includes an address region to which the access address is written, an attribute region indicating whether the access has a write or read attribute, a sideband information region to which sideband information indicating an attribute of transmission data is written, and a write data region to which write data is written. The sideband information includes access size information indicating the size of the data, a cacheable access flag indicating whether the bus request should be served via the cache memory, a bus priority flag indicating authority to preferentially use the bus, and the compulsory execution flag. That is, the compulsory execution flag is 1-bit data of the side band information region. The compulsory execution flag indicates enabled when the corresponding bit is 1 and indicates disabled when the corresponding bit is 0, for example.

Next, the second module is explained in more detail. In the example shown in FIG. 1, the L2 cache 14, the DMA controller 15, and the USB interface 16 function as the second modules. However the L2 cache 14 is explained as the second module, as the configuration necessary to perform the operation according to the compulsory process request code is the same for the DMA controller 15 and the USB interface 16.

Figure 5:
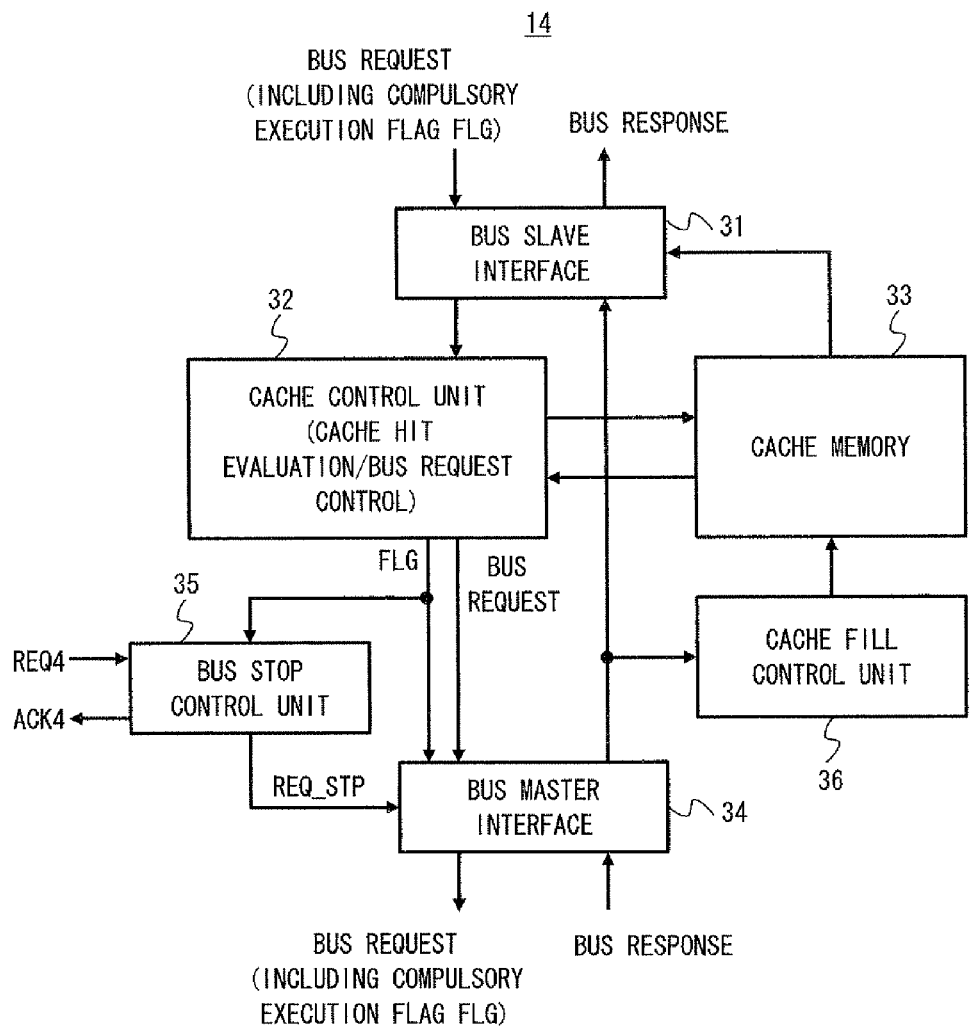
FIG. 5 is a block diagram of an L2 cache according to the first embodiment.

FIG. 5 is a block diagram of the L2 cache 14. As shown in FIG. 5, the L2 cache 14 includes the second interface unit (for example, a bus slave interface 31), a cache control unit 32, cache memory 33, a third bus interface unit (for example, a bus master interface 34), a bus stop control unit 35, and a cache fill control unit 36.

The bus slave interface 31 receives the bus request from the core bus BUS1. This bus request includes a compulsory execution flag FLG. The bus slave interface 31 supplies the cache control unit 32 with the received bus request. The cache control unit 32 performs a cache hit evaluation process for evaluating whether or not the data supplied by the bus request exists in the cache memory 33. When the requested data is evaluated to exist in the cache memory 33 by the cache hit evaluation process, the cache control unit 32 prevents the bus request from being transmitted to the subsequent stage. Whereas when the requested data is evaluated not to exist in the cache memory 33 by the cache hit evaluation process, the cache control unit 32 performs a bus request control process for transmitting the bus request to the subsequent stage. When the requested data exists in the cache memory 33, the L2 cache 14 returns the data stored to the cache memory 33 via the bus slave interface 31. This return will be the bus response.

On the other hand, when the requested data does not exist in the cache memory 33, the L2 cache 14 issues the second transaction (for example, the bus request) by the bus master interface 34 in order to secure the requested data. The bus request output from the bus master interface 34 includes the compulsory execution flag FLG.

Further, in the L2 cache 14, the information of the compulsory execution flag FLG is supplied to the bus stop control unit 35. In response to the assertion of the bus master stop request REQ4, the bus stop control unit 35 asserts a transaction issue stop signal REQ_STP and the bus master stop acknowledgement ACK4 to the bus master interface 34 in order to stop issuing the second transaction. Moreover, when the compulsory execution flag FLG is added to the bus request input via the bus slave interface 31, the bus stop control unit 35 negates the transaction issue stop signal REQ_STP regardless of whether the bus master stop request REQ4 is asserted.

The bus master interface 34 stops issuing new bus requests in the period when the transaction issue stop signal REQ_STP is asserted. On the other hand, the bus master interface 34 issues the bus request in the period when the transaction issue stop signal REQ_STP is negated. This bus request is transmitted to the third module (for example, the internal memory 18) including the fourth interface unit functioning as the bus slave.

In addition, the bus master interface 34 outputs the bus response to the cache fill control unit 36 and the bus slave interface 31 in response to the bus response corresponding to the bus request issued by the bus master interface 34. The cache fill control unit 36 stores data included in the received bus response to the cache memory 33. The bus slave interface 31 outputs the bus response output from the bus master interface 34 to the core bus.

As was previously mentioned, the second module (for example, the L2 cache 13, the DMA controller 15, and the USB interface 16) includes the bus stop control unit 35. The bus stop control unit 35 achieves to issue the second transaction while asserting the bus master stop acknowledgements ACK4 to ACK6 even in the case where the first transaction added with the compulsory process request code is received in the period when the bus master stop requests REQ4 to REQ6 are asserted.

Figure 6:
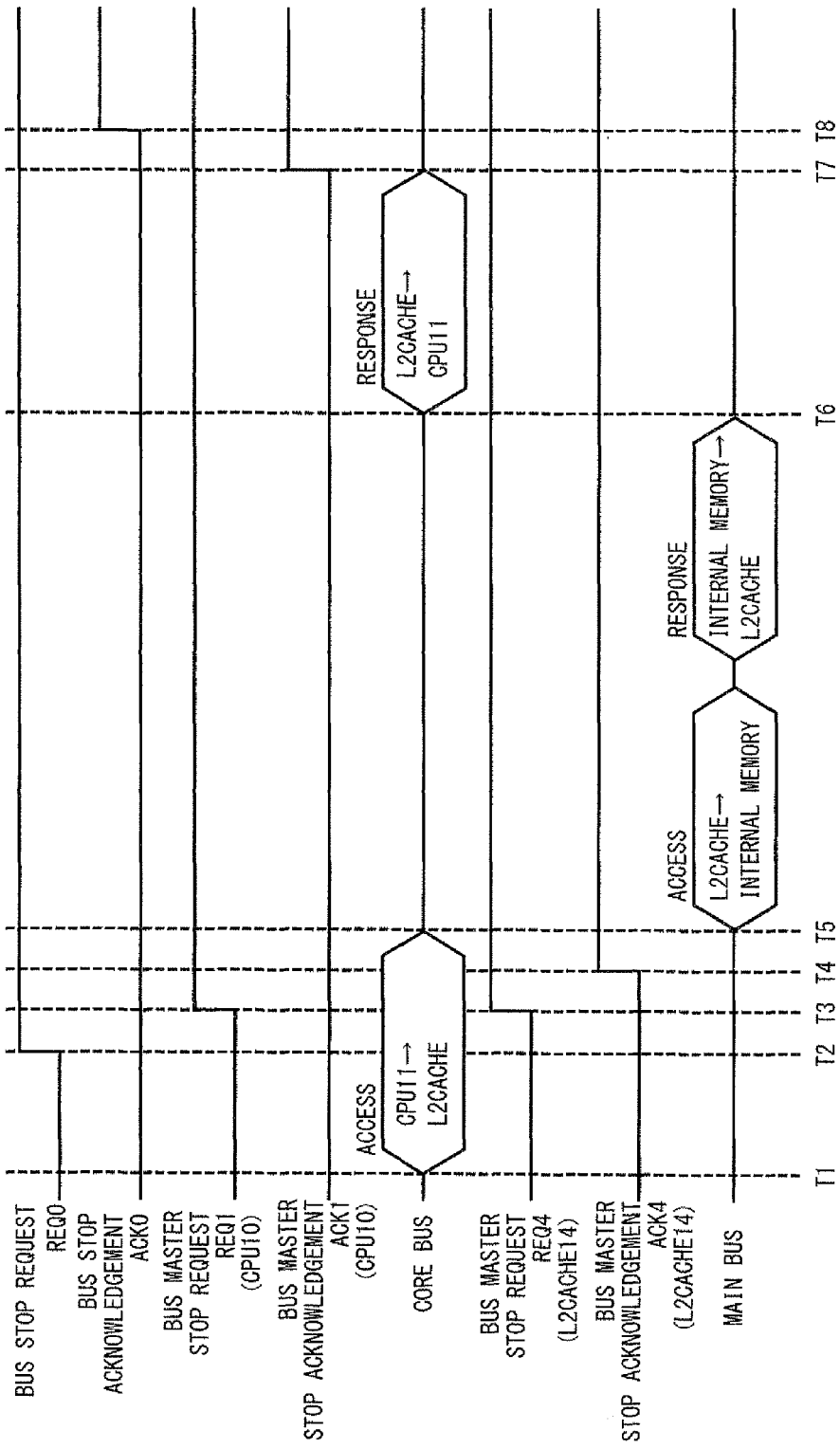
FIG. 6 is a timing chart showing an operation of the semiconductor device according to the first embodiment.

Subsequently, an operation of the semiconductor device 1 according to the first embodiment is explained. FIG. 6 is a timing chart showing an operation of the semiconductor device 1. FIG. 6 exemplifies the case in the semiconductor device 1 focusing on the operation in which when the CPU 11 issues the bus access to the L2 cache 14 and the L2 cache 14 issues the bus access to the internal memory 18, the bus stop request REQ0 is issued after the CPU 11 issued the bus access. Note that the CPU 12, the graphics core 13, the DMA controller 15, and the USB interface 16 immediately assert the bus master stop acknowledgements ACK2, ACK3, ACK5, and ACK6 in response to the bus master stop requests REQ2, REQ3, REQ5, and REQ6, thus timing charts for these circuit blocks are not illustrated in FIG. 6.

In the example shown in FIG. 6, the CPU 11 issues the bus access to the L2 cache 14 at the timing T1. Then, at the timing T2, i.e., before the L2 cache 14 issues the bus access, the power management unit 19 asserts the bus stop request REQ0. Subsequently, at the timing T3, the bus master stop request control unit 10 asserts the bus master stop requests REQ1 and REQ4 in response to the assertion of the bus stop request REQ0. The L2 cache 14 asserts the bus master stop acknowledgement ACK4 in response to the assertion of the bus master stop request REQ4 at the timing 4.

In the example shown in FIG. 6, since a cache miss occurred in the L2 cache 14, the L2 cache 14 issues the bus access to the internal memory 18 at the timing T5. At this time, in the semiconductor device 1, the CPU 11 adds the compulsory execution flag FLG and issues the bus access. Therefore, with this compulsory execution flag FLG, in the L2 cache 14, the bus master interface 34 can issue the bus access after asserting the bus master stop acknowledgement ACK4 at the timing T4.

In the semiconductor device 1, the internal memory 18 returns the bus response in response to the bus access issued at the timing T5, and the bus response corresponding to the bus access issued at the timing T1 reaches the CPU 11 at the timing T6. Then, at the timing T7 when the process regarding the bus response is completed in the CPU 11, the bus master interface 23 in the CPU 11 asserts the bus master stop acknowledgement ACK1. All the bus master stop acknowledgements ACK1 to ACK6 are asserted at the timing T7, thus the bus master stop request control unit 10 asserts the bus stop acknowledgement ACK0 at the timing T8.

As shown in FIG. 6, the semiconductor device 1 according to the first embodiment can complete the operation regarding the bus access issued by the CPU 11 even when the bus stop request REQ0 is asserted by performing control in accordance with the compulsory execution flag FLG.

Figure 7:
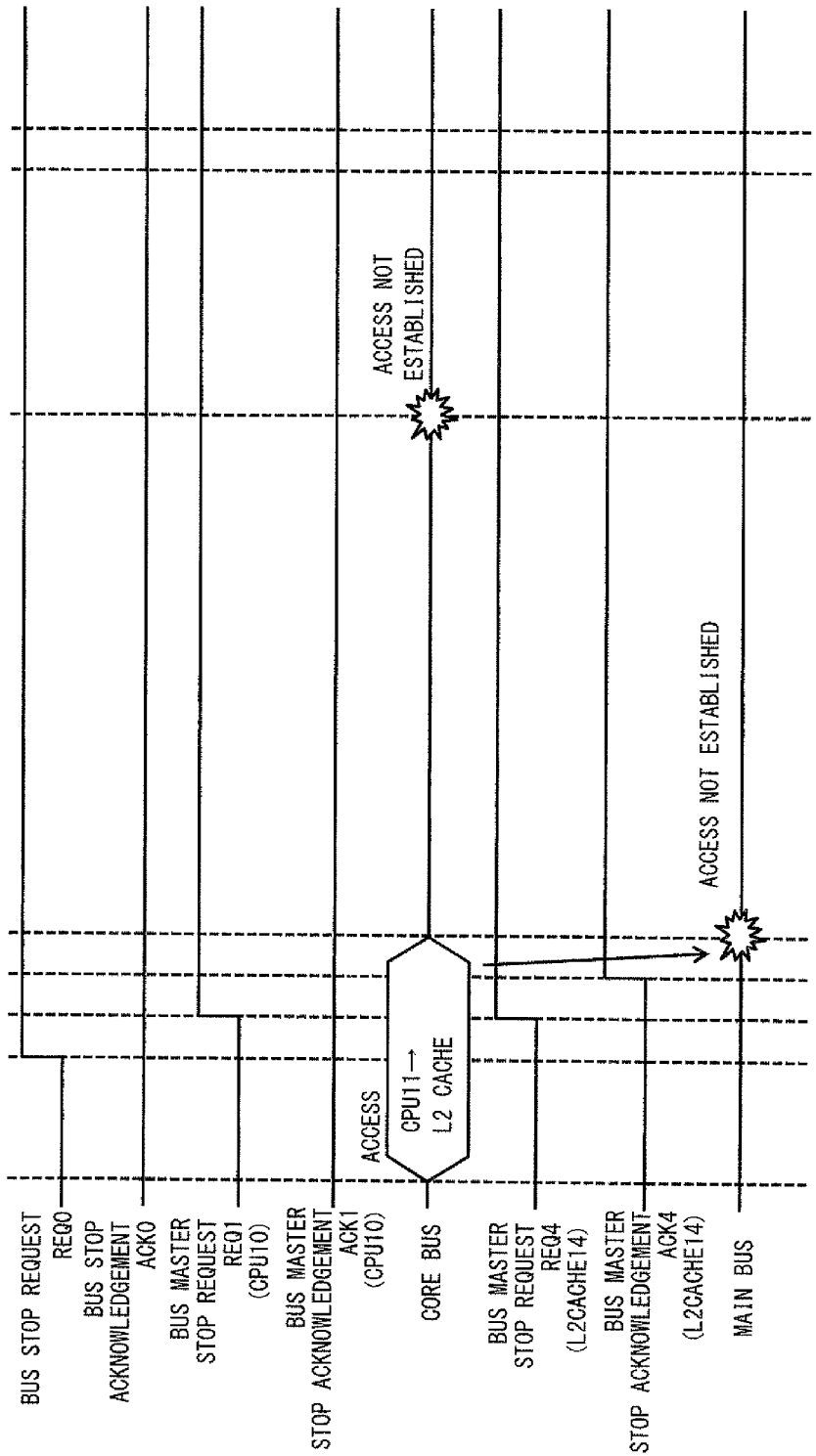
FIG. 7 is a timing chart showing an operation in the case of not using a compulsory process request code in the semiconductor device according to the first embodiment.

Explained below is an operation of the semiconductor 1 not using the compulsory execution flag FLG, as a comparative example. FIG. 7 is a timing chart showing an operation of the semiconductor device 1 not using the compulsory execution flag FLG. Note that the comparative example shown in FIG. 7 is the case when the operation of the semiconductor device 1 shown in FIG. 6 is performed without the compulsory execution flag FLG.

As shown in FIG. 7, when the compulsory execution flag FLG is not used, the bus master stop request REQ4 is asserted (at the timing T3) before the L2 cache 14 issues the bus access by the bus stop request REQ0 asserted at the timing T2. The L2 cache 14 is prohibited from issuing new transactions from then on in response to the bus master stop request REQ4 asserted at the timing T3. Then, the bus access issued at the timing T5 will not be issued. Since the bus access is not issued at the timing T5, the bus response will not reach the CPU 11 even on and after the timing T6, and the bus master stop acknowledgement ACK1 is therefore not asserted. Accordingly, in the example shown in FIG. 7, a problem is generated in which the bus master stop acknowledgement ACK1 corresponding to the bus master stop request REQ1 is not asserted, the bus master stop request control unit 10 is unable to complete the assertion process of the bus master stop request, thereby causing the system to hang.

Figure 8:
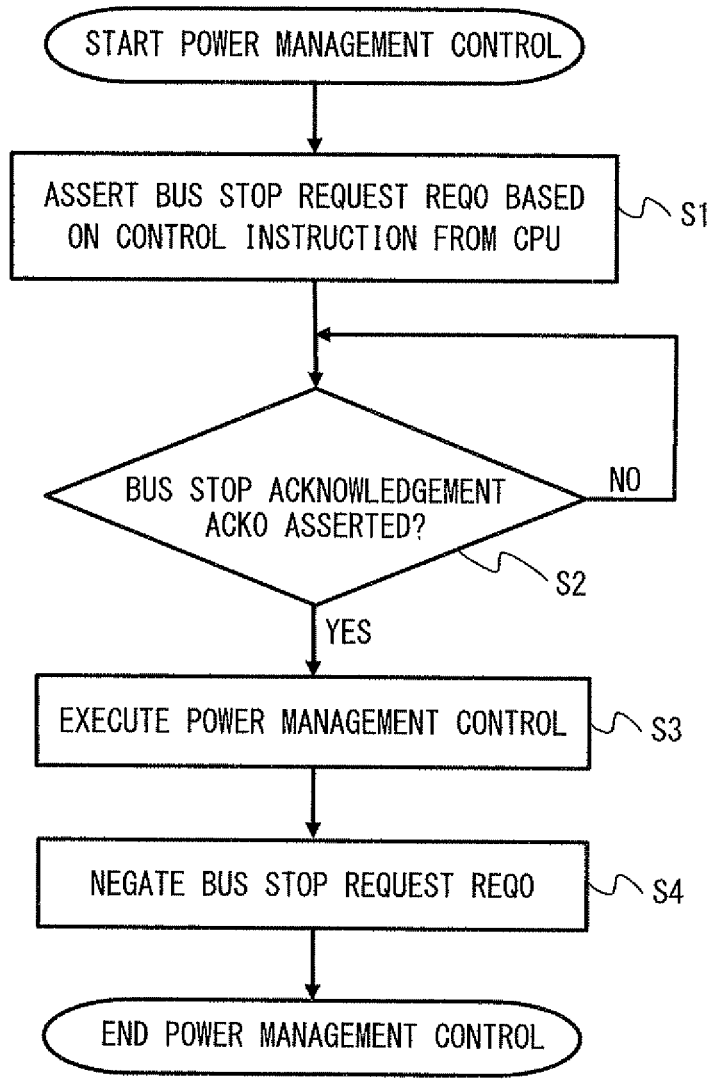
FIG. 8 is a flowchart showing an operation of a power management unit according to the first embodiment.

Given below is an explanation for an operation of the power management unit 19 among the operations of the semiconductor device 1 according to the first embodiment. FIG. 8 is a flowchart showing an operation of the power management unit 19. Note that FIG. 8 illustrates an example in which the CPU 11 supplies the power management unit 19 with a control instruction, however the control instruction may be supplied from other circuit blocks such as the CPU 12.

As shown in FIG. 8, the power management unit 19 asserts the bus stop request REQ0 based on the control instruction from the CPU 11 (step S1). Subsequently, the power management unit 19 waits for the assertion of the bus stop acknowledgement ACK0 corresponding to the bus stop request REQ0 (step S2). Next, the power management unit 19 performs power management control in response to the assertion of the bus stop acknowledgement ACK0 (step S3). This power management control executes processes including, changing frequency of a clock signal to be supplied to the circuit blocks that are connected to the core bus, the system bus, and the bus, stopping the clock signal, and control to block power supply. The power management unit 19 waits for predetermined waiting time after the power management control process is completed and negates the bus stop request REQ0 (step S4). Note that the bus master stop request control unit 10 negates the bus master stop requests REQ1 to REQ6 in response to the negation of the bus stop request REQ0.

From the above explanation, the semiconductor device according to the first embodiment adds the compulsory execution flag FLG to the first transaction (for example, the bus access issued by the CPU 11). The second module (for example, the L2 cache 14) receives the first transaction added with the compulsory execution flag FLG, and when the compulsory execution flag FLG is enabled, allows the third interface unit (for example, the bus master interface 34) to issue the second transaction even in the period when the bus master stop request REQ4 is asserted. This enables the semiconductor device 1 to normally stop the bus without causing the system to hang upon assertion of the bus stop request REQ0 at any timing.

Further, the bus system that mutually connects the circuit blocks via the bus can prevent hang-ups by controlling the assertion order of the bus master stop requests REQ1 to REQ6 using the program or control at the design stage of the hardware. However, when the assertion order is controlled by the program or the hardware, it is necessary to take measures for all modes in which the system hangs, thereby leading to a problem that complicates the design and increases the risk of generating bugs.

However, the semiconductor device 1 according to the present invention can prevent hang-ups regardless of the bus configuration only by adding the compulsory execution flag to the bus access that might cause the system to hang. In recent years, the configuration of the bus system tends to be more complicated such that the bus system is composed of multi-stage bus and combination of buses with different operating speeds. In the bus system with such a complicated configuration, it is extremely difficult to take into consideration all the operation modes that could generate bugs at the design stage or the design stage of the program. In this regard, the semiconductor device 1 according to the first embodiment can prevent the bus system from hanging without considering the operation mode that could cause the system to hang, and thereby facilitating the design. This advantage appears more notably with more complicated configuration of the bus system.

Moreover, in the semiconductor device 1 according to the first embodiment, the power management unit 19 can change and stop the operating frequency of the bus system or block the power supply of the bus system. For this reason, in the semiconductor device 1, it is possible to adjust the power consumption depending on the processing capabilities required by the system, and thus enabling reduction in the power consumption depending on the processing capabilities.

Second Embodiment

An example of providing the code addition unit on a router composing the core bus is explained in the second embodiment. Note that the function of the code addition unit is eliminated from the first module such as the CPU 11 in the semiconductor device according to the second embodiment. Further, the block diagram of the semiconductor device according to the second embodiment is same as that of the semiconductor device 1 according to the first embodiment shown in FIG. 1, thus the explanation is not repeated here.

Figure 9:
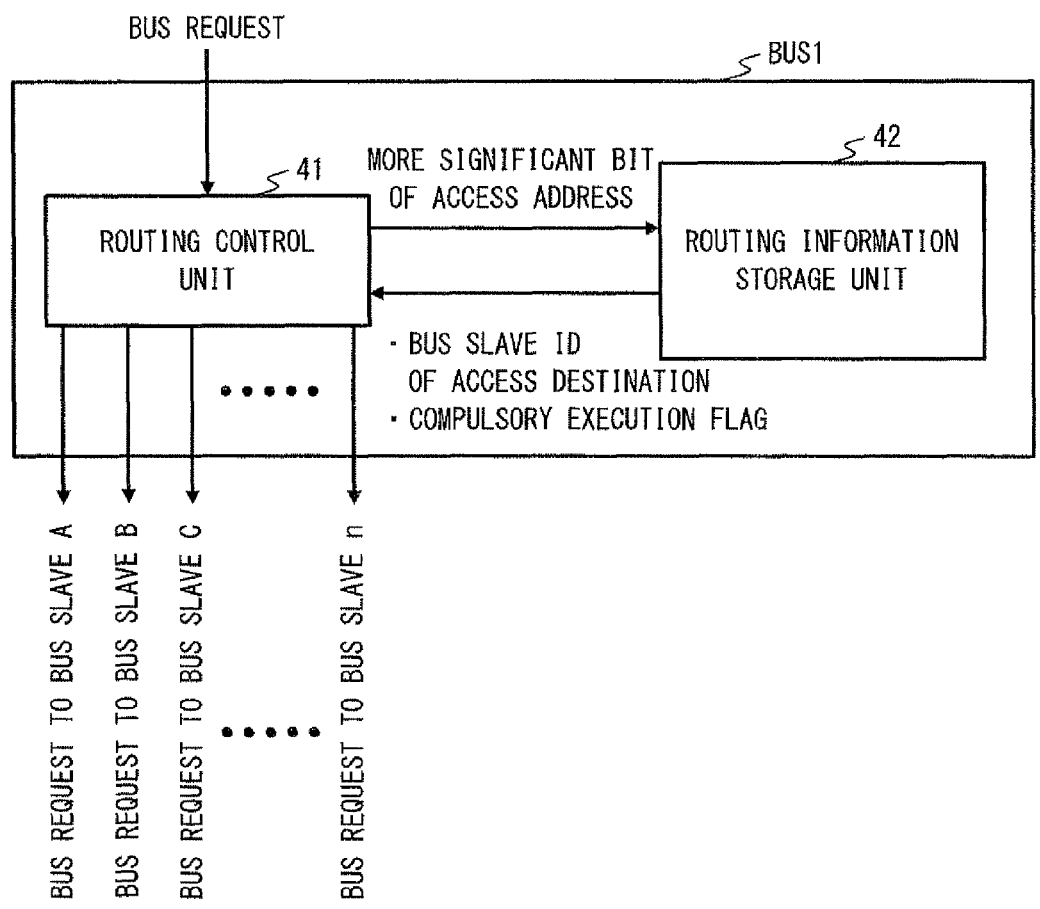
FIG. 9 is a block diagram of a router according to a second embodiment.

FIG. 9 is a block diagram of a router according to the second embodiment including the function as the code addition unit. As shown in FIG. 9, the router includes a routing control unit 41 and a routing information storage unit 24.

In response to the bus request from the first module (for example, the CPUs 11 and 12, and the graphics core 13), the routing control unit 41 outputs the bus request to the bus slave interface in the circuit block to which the bus request is transmitted. Moreover, the routing control unit 41 outputs a more significant bit of the access address of the received bus request to the routing information storage unit 42.

The routing information storage unit 42 outputs the compulsory execution flag FLG to be added to the bus request while replacing the more significant bit of the access address with the bus slave ID corresponding to the more significant bit of the access address. Note that the bus slave ID is a value for identifying the second bus interface functioning as the bus slave. The routing control unit 41 adds the compulsory execution flag FLG to the received bus request, and then outputs the bus request to one of the bus slaves. Additionally, the routing information storage unit 42 includes a routing table that defines a rule of routing.

FIG. 10 shows an example of a schematic diagram of the routing table. As shown in FIG. 10, the routing table defines the association between the more significant bit of one access address and a pair of the bus slave ID and the compulsory execution flag FLG. The routing information storage unit 42 outputs the bus slave ID and the compulsory execution flag FLG based on the routing table corresponding to the bus request.

As has been described, even when the code addition unit is provided on the router, the code addition unit can supply the second module with the first transaction (for example, the bus access) added with the compulsory execution flag FLG, which causes the system to hang. Further, the semiconductor device according to the second embodiment can issue the second transaction (the bus access issued to the third module) even in the period when the bus stop request REQ0 is asserted based on the compulsory execution flag FLG. Accordingly, the semiconductor device according to the second embodiment can prevent the system to hang upon assertion of the bus stop request REQ0 at any timing.

The first and second embodiments can be combined as desirable by one of ordinary skill in the art.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. A semiconductor device including a plurality of interface units that are connected via a bus and assigned with either one of a bus master that issues a transaction and stops issuing the transaction in response to a bus master stop request and a bus slave that receives the transaction, the semiconductor device comprising:
    a first module that includes a first interface unit functioning as the bus master and configured to issue a first transaction;
    a second module that includes a second interface unit functioning as the bus slave and a third interface unit functioning as the bus master, and configured to issue a second transaction in response to the first transaction;
    a third module that includes a fourth interface unit functioning as the bus slave and configured to receive the second transaction;
    a bus master stop request control unit that is configured to assert the bus master stop request and, in response to assertion of a bus master stop acknowledgement corresponding to the bus master stop request, to complete an assertion process of the bus master stop request; and
    a code addition unit that is configured to add a compulsory process request code to the first transaction, wherein the second module is configured to issue the second transaction while asserting the bus master stop acknowledgement when the second module receives the first transaction added with the compulsory process request code in a period when the bus master stop request is asserted, and the first module is configured to assert the bus master stop acknowledgement corresponding to the bus master stop request in response to reception of a response to the first transaction.

2. A semiconductor device including a plurality of interface units that are connected via a bus and assigned with either one of a bus master that issues a transaction and stops issuing the transaction in response to a bus master stop request and a bus slave that receives the transaction, the semiconductor device comprising:

a first module that includes a first interface unit functioning as the bus master and configured to issue a first transaction;

a second module that includes a second interface unit functioning as the bus slave and a third interface unit functioning as the bus master, and configured to issue a second transaction in response to the first transaction;

a third module that includes a fourth interface unit functioning as the bus slave and configured to receive the second transaction;

a bus master stop request control unit that is configured to assert the bus master stop request and, in response to assertion of a bus master stop acknowledgement corresponding to the bus master stop request, to complete an assertion process of the bus master stop request; and a code addition unit that is configured to add a compulsory process request code to the first transaction, wherein the second module is configured to issue the second transaction while asserting the bus master stop acknowledgement when the second module receives the first transaction added with the compulsory process request code in a period when the bus master stop request is asserted, and the first module is configured to assert the bus master stop acknowledgement corresponding to the bus master stop request in response to reception of a response to the first transaction, wherein the second module includes a bus stop control unit that is configured to negate a transaction issue stop signal regardless of whether the bus master stop request is asserted when the compulsory process request code is added to the first transaction while asserting to the third interface unit the transaction issue stop signal and the bus master stop acknowledgement to stop issuing the second transaction in response to reception of the bus master stop request.

3. The semiconductor device according to claim 1, wherein the code addition unit is provided inside the first module and is configured to supply the first interface unit with the first transaction that is added with the compulsory process request code.

4. The semiconductor device according to claim 1, wherein the code addition unit is provided on a bus router that composes the bus and is configured to add the compulsory process request code to the received first transaction.

5. The semiconductor device according to claim 1, further comprising a power management unit that is configured to assert a bus stop request to be supplied to the bus master stop request control unit and to control an operating state of at least one of a module to be connected to the bus and the bus according to a bus stop acknowledgement asserted by the bus master stop request control unit in response to the completion of the assertion process by the bus master stop request control unit.

6. The semiconductor device according to claim 5, wherein
the power management unit includes a plurality of configuration registers that define the operating state of the module to be connected to the bus and the bus, and
the plurality of configuration registers are configured to define the operating state of at least one of the module to be connected to the bus or the bus in response to the assertion of the bus stop acknowledgement.

7. The semiconductor device according to claim 5, wherein the power management unit is configured to change a frequency of an operational clock of at least one of the module to be connected to the bus or the bus in response to the assertion of the bus stop acknowledgement, to stop an operational clock signal, or to block power supply voltage of the module to be connected to the bus.

* * * * *